US008819212B1

(12) United States Patent
Nair et al.

(10) Patent No.: US 8,819,212 B1
(45) Date of Patent: Aug. 26, 2014

(54) DELEGATION OF DATA CLASSIFICATION USING COMMON LANGUAGE

(71) Applicant: EMC Corporation, Hopkinton, MA (US)

(72) Inventors: Manoj Nair, Cary, NC (US); Stephen R. Perrin, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/972,089

(22) Filed: Aug. 21, 2013

Related U.S. Application Data

(63) Continuation of application No. 11/864,605, filed on Sep. 28, 2007, now Pat. No. 8,548,964.

(51) Int. Cl.
*G06F 15/173* (2006.01)
*H04L 12/24* (2006.01)

(52) U.S. Cl.
CPC ........ *H04L 41/5003* (2013.01); *H04L 41/5009* (2013.01)
USPC ............................ 709/223; 709/224; 709/226

(58) Field of Classification Search
None
See application file for complete search history.

(56) References Cited

U.S. PATENT DOCUMENTS

| | | | | |
|---|---|---|---|---|
| 6,003,040 | A * | 12/1999 | Mital et al. | 717/165 |
| 7,433,304 | B1 * | 10/2008 | Galloway et al. | 370/229 |
| 7,565,324 | B2 * | 7/2009 | Vincent | 705/50 |
| 7,895,220 | B2 * | 2/2011 | Evans et al. | 707/756 |
| 7,953,740 | B1 * | 5/2011 | Vadon et al. | 707/751 |
| 8,069,435 | B1 * | 11/2011 | Lai | 717/106 |
| 2002/0120685 | A1 * | 8/2002 | Srivastava et al. | 709/203 |
| 2003/0225829 | A1 * | 12/2003 | Pena et al. | 709/203 |
| 2004/0060002 | A1 * | 3/2004 | Lucovsky et al. | 715/513 |
| 2004/0098415 | A1 * | 5/2004 | Bone et al. | 707/200 |
| 2004/0236660 | A1 * | 11/2004 | Thomas et al. | 705/37 |
| 2005/0251533 | A1 * | 11/2005 | Harken et al. | 707/104.1 |
| 2006/0036463 | A1 * | 2/2006 | Patrick et al. | 705/1 |
| 2006/0039364 | A1 * | 2/2006 | Wright | 370/352 |
| 2006/0106782 | A1 * | 5/2006 | Blumenau et al. | 707/3 |
| 2006/0248187 | A1 * | 11/2006 | Thorpe et al. | 709/224 |
| 2007/0103984 | A1 * | 5/2007 | Kavuri et al. | 365/185.17 |
| 2007/0299828 | A1 * | 12/2007 | Lewis et al. | 707/3 |
| 2008/0005086 | A1 * | 1/2008 | Moore | 707/3 |
| 2010/0250497 | A1 * | 9/2010 | Redlich et al. | 707/661 |

FOREIGN PATENT DOCUMENTS

| | | | |
|---|---|---|---|
| EP | 1855218 A2 * | 11/2007 | 17/30 |

OTHER PUBLICATIONS

Morrie Gasser, Ellen McDermott "An Architecture for Practical Delegation in a Distributed System", 1990 IEEE Computer Society Symposium, May 7-9, 1990, pp. 20-30.*

* cited by examiner

*Primary Examiner* — Polina Peach
(74) *Attorney, Agent, or Firm* — Workman Nydegger

(57) ABSTRACT

An information management system delegates information classification to an external computing resource, or classifier. The intelligence required to perform classification, including a series of logic and/or rules, is provided to the classifier. The logic and/or rules are translated from a first format to a second format understandable to the classifier. The information management system discovers objects of an entity and identifies them for the classifier. The classifier collects information about the objects, applies the logic and rules to the objects, and assigns one or more categories to each object. This classification information is translated from the second format to the first format and reported back to the information management system, which may use the assigned categories to identify and map service level objectives to available service levels. After service levels are selected, the corresponding actions can be orchestrated such that the objects of the entity receive the selected services.

20 Claims, 3 Drawing Sheets

DELEGATION OF DATA CLASSIFICATION USING COMMON LANGUAGE

CROSS-REFERENCE TO RELATED APPLICATIONS

This application is a continuation of, and hereby claims priority to, U.S. patent application Ser. No. 11/864,605, entitled DELEGATION OF DATA CLASSIFICATION USING COMMON LANGUAGE, and filed Sep. 28, 2007. The aforementioned application is incorporated herein in its entirety by this reference.

BACKGROUND OF THE INVENTION

1. The Field of the Invention

The present invention relates to information management. More particularly, embodiments of the invention relate to systems and methods for delegating information classification in a computer system.

2. The Relevant Technology

The world is slowly and continually moving from being paper-based to being electronic-based. This evolution is apparent in almost every aspect of life, from the workplace, to government institutions, to home life. In each area, old paper-based methods of communication and storage are being replaced by electronic information. Businesses have replaced bulky paper files and expensive storage rooms with electronic files and searchable databases. Tax-payers are encouraged to submit returns electronically rather than in paper form, and email is rapidly becoming the principal form of communication.

There are several reasons for this transition, one of which is the convenience and accessibility of electronic systems. Email, for example, often arrives shortly after sending it, and information submitted electronically can be quickly formatted, processed, and stored without the inconvenience of manually reviewing each submission by hand.

As entities become more dependent on electronic data, the ability to manage electronic data becomes crucial for a variety of different reasons. For example, much of the electronic data maintained by an entity or organization often relates to different aspects of the entity and is often subject to various considerations. Without an effective way to manage the electronic data, it is difficult to apply the appropriate considerations to the data.

Further, often there is a large amount of unstructured data, meaning that the value of the data to the entity is not readily known, nor are the services required to manage the data. For example, an entity may have a file storage system that is regularly backed up, despite the presence of files on the system that have little or no value to the entity. Thus, without an effective way to sort, classify, and maintain the files, the entity pays for unneeded services.

Additionally, there may be data that is subject to certain state and federal regulations based on information stored in the content of the data. Without a method of searching data based on content, certain data or files may not receive the services mandated by the regulations, and the entity may be subject to liability.

Generally, there are a number of factors used to determine how data is handled and which services are needed to properly maintain the data. Some of the factors or considerations commonly used include data security, data backup, data retention, data access control, regulatory compliance, corporate compliance, and the like or any combination thereof.

Various information management systems and methods exist, some of which may address these and other factors. Notably, however, the amount of electronic data that can be managed by an information management system is often limited by the physical limits of the hardware implementing the information management system. For instance, an information management server is necessarily limited in the amount of electronic data it can manage by, among other things, its processors and other hardware. Thus, the scalability of an information management system is an important consideration for entities desiring to implement information management in a network.

Two conventional scaling solutions often implemented include scaling up and scaling out. Scaling up, for example, includes implementing the information management system in a server with faster hardware. Often, however, the cost of scaling up can be prohibitively high. Scaling out involves replicating the information management server and distributing the work across the resulting server instances, with each server instance managing a subset of a network, or partitioning/separating out low-level information management functions to other servers. In the case of the former, the use of multiple information management servers can present integration difficulties and in the case of the latter, high-level functions not partitioned to the other servers still require significant computing resources from the information management server.

What are needed, therefore, are improved methods and systems for managing electronic data in a network.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
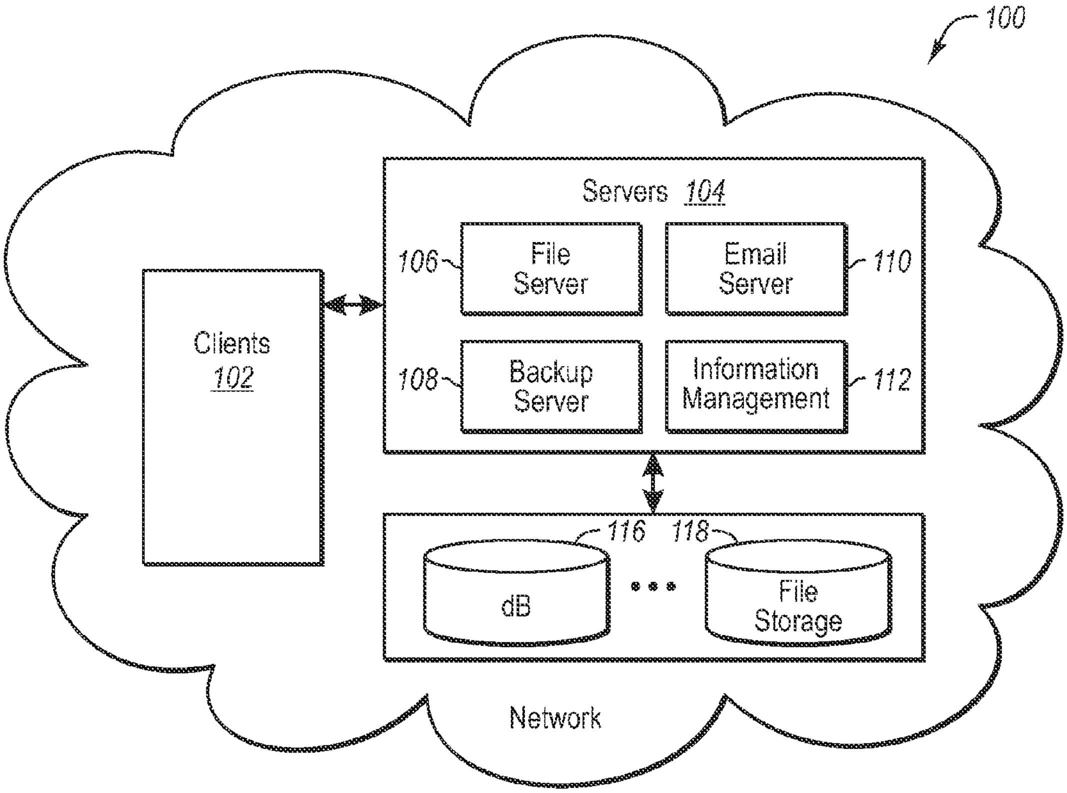
FIG. 1 illustrates an example environment for implementing embodiments of the invention.

Embodiments of the invention relate to the classification of objects in a system such as a computer system. Classifying objects enables an information management system to identify and orchestrate services such as data protection, data placement, corporate compliance, and others based on the value of the underlying data. Embodiments of the invention enable the data to be classified in a highly automated fashion that provides various levels of granularity that can be adjusted as needed. An entity can be assured that its data is receiving the services that are actually required. In another embodiment, classification or categorization enables an entity to evaluate the value of its data independently of or in conjunction with services identified herein. Further, embodiments of the invention enable the classification of objects to be performed by an external computing resource, thereby increasing the efficiency of the information management system.

Implementing information classification in accordance with the present invention requires an understanding of computer systems, networks, or servers operating on the systems, services operating on the system, and of the objects (e.g., directories, volumes, files, folders, user data, system data, content, servers, databases, applications, services, operating systems, instructions, information, emails, computer settings, etc.) that exist in or are accessible by clients, servers, applications, and services on the system. By way of example only, a computer system can be a single computer, a collection of computers (including clients, servers, and applications) that are connected with a network, and the like or any combination thereof.

The knowledge needed to implement information management and in particular to perform information classification can be obtained through discovery of the computer system, which provides the information management system with an understanding of the relationships that may exist between the various servers (and other devices) on the computer system and the data that is accessible over the system. According to the present invention, the discovery of a network provides information that can be used to classify the network and the data in the system.

After the computer system (environment and data) has been discovered, it is useful to classify the system environment and the data that is in the system using a computing resource external to the information management system. For example, embodiments of the invention enable each object to be categorized and classified individually according to a series of entity-defined rules, although default rules can also be applied. An object can be any data (e.g., file, content, email, web page), server, service, application or the like in the system or in the environment in which information management is practiced. Classification is discussed more fully below and typically uses series of rules and/or logic that are applied to or based on the environment, content, or metadata to differentiate the data. A further aspect of the present invention includes the generation of metadata during the classification. Then, using the existing metadata and metadata generated during the classification process, categories can be assigned to each object.

Once classification is complete, the information management system may use the categories created during information classification to perform service level management. Service level management provides methods for modeling/mapping the results of discovery and/or classification to service levels. Service level objectives, for example, can be determined based on the assigned categories. After service level objectives have been identified, the various service levels can be selected. Next, the selected services are orchestrated and executed. Thus, information classification is one part of a broader information management service and it provides a mechanism whereby the management services may be carried out with respect to individual objects rather than on shares or drives. As a result, an entity may only pay for the services that are actually needed rather than pay for services that may not be needed. Further, data, including unstructured data, is categorized and can be provided with the services based on its value to the entity. In one embodiment, classification is a way for an entity to automatically place a value on the various objects of data.

Information management is also a process that can be ongoing. Information management can also be implemented in various types of environments. Embodiments of the invention, for example, can be implemented on computer systems such as a single computer or in a network or series of computers. In each of these examples of a computer system, the environment and data are discovered and classified. Service levels are then identified based on the categorizations assigned during information classification. The resulting services associated with the service levels may then be orchestrated. Alternatively, the categorization may be used to evaluate existing data without requiring the selection and orchestration of services.

In most computer systems, objects are continually added to the system and those objects typically require certain services. In addition to new objects, many objects also have a lifecycle associated with them. Other objects may change over time (by being edited, for example). As a result, the status or need for services for certain objects can change over time. Information management incorporates lifecycle aspects such that data that grows old or stale can have the various services changed as needed.

Also, embodiments of the invention include reports, auditing, and the like to ensure that the services being provided are adequate. This protective ability ensures, for example, that a company complies with any applicable rule or regulation. The detection of a gap in service, for example, can lead to a change in service levels.

I. Computer System Environment

FIG. 1 illustrates an example environment for implementing embodiments of the invention. FIG. 1 is intended to illustrate that, while many systems often have similar functions, the actual implementation from one computer system to the next can vary significantly. The variability in computer system configurations is one of the aspects that have hindered conventional attempts at information management. The variability may be related, for example, to the type of software installed, the hardware selected for the computer system, the configuration of the hardware/software and the like. As previously described, this is one of the reasons that discovery of a computer system is not limited to the objects in the system but also includes discovery of the servers and services that are operating in the system. An understanding of the servers and services can improve the ease and accuracy with which objects are classified.

In this example, the system 100 represents a network such as a local area network, a wide area network, and the like or any combination thereof. The connections in the system or network 100 can be wired and/or wireless. In this case, the network 100 typically includes clients 102 that have access to various servers 104 and to data 114. Various applications and services are typically provided by the servers 104 and, in some embodiments, access to some or all of the data 114 is controlled by the various servers 104. Some of the data 114 (e.g., backed up data) is not necessarily available to the clients 102.

Examples of the servers 104 may include a file server 106, an email server 110, a backup server 108, and an information management server 112 and the like or any combination thereof. Each of the servers 104 resides in or is accessible over the network 100. The data 114 may include file storage 118, a database 116, and the like. The file storage 118 and database can be implemented in various ways using different software, different configurations, and the like. The hardware used to store the data 114 can include network attached storage (NAS) systems, and any other system known to one of skill in the art.

The data 114 can also be partitioned in different ways as well for different lines of business within the entity. For example, the data 114 may include a share for home directories, a shared area, an engineering share, and a marketing and sales share. Each share may be in its own domain to allow fine grain management by the respective line of business. One advantage of having different shares is that the corresponding files can be owned by different users.

One of skill in the art can appreciate that the clients 102, servers 104, and data 114 can be connected in a wide variety of configurations using various types of connections. Further, the applications that operate on the servers 104, clients 102, and on the data 114 in some instances, may have certain properties or configurations. As previously discussed, it is this variability that can often complicate the ability to manage the information in a computer system.

II. Information Management in a Computer System

Information management according to embodiments of the invention has several components that work together to provide an understanding of the value of an entity's information. In some instances, the entity itself can provide or define some of the logic or rules that are used to classify or categorize the objects. Embodiments of the invention enable an entity to control some or all of the logic used for classification. Advantageously, this illustrates one way that embodiments of the invention enable an entity to better value its data. Objects can be classified or categorized individually using the entity's own logic. As a result, the service levels ultimately identified for those objects reflect the entity's perception of the objects' worth.

For example, an entity may want to retain objects that were authored by a particular person for a long period of time. A rule to that effect that is processed for the objects of the entity can then help classify the objects in an automated manner and the entity may evaluate the cost of assuring that all objects that satisfy that requirement receive the appropriate services. Advantageously, the present invention enables the entity to use the classification system to evaluate the cost of implementing the desired service levels.

While this example illustrates the evaluation of a single rule or objective, an information management system can examine all business objectives for the objects in a computer system, not just one at a time, and use the information classification process to associate those objectives to the files without disrupting any additional associations. For example, some of the files authored by a particular person may also contain personal data on employees who have left the entity. Such files often fall under laws that require their destruction after a certain time period. Thus, some of the files authored by the person may need to be retained for a shorter length of time due to a more pressing consideration (regulations). One embodiment of information classification can thus consider both the desire to retain files written by the author and consider regulations at the same time, for each object. This aspect of the present invention enables a sophisticated information management system to recognize conflicting service goals without disassociating the data from any of the service areas, as in this example, and then resolve the conflict. User defined configurations, for example, may be used to resolve conflict. For example, regulations may have priority over an entity's desire to retain certain files. In another example, the objectives may not conflict, but be additive. For example, an entity may desire to retain all files written by a particular author and make those files searchable by indexing them.

Information management also reduces various risks (such as non-compliance) often associated with data including unstructured data. As described below, embodiments of the invention provide a system for classifying data such that the appropriate services can be provided to the data. Embodiments of the invention also enable services that are required by an entity to be effectively identified and orchestrated. Examples of the services often required by entities for their data include backup services, retention services, corporate compliance services, regulatory compliance, data accessibility, data deletion, access control, disaster recovery, and the like or any combination thereof.

As discussed above, information classification is typically a portion of the larger information management process. In order to more fully explain the information classification process, an explanation of the methodology of information management is presented in the context of FIG. 2. Following this introduction, a more detailed explanation of the delegation of information classification according to the present invention will be given below.

A. Discovery in Information Management

Figure 2:
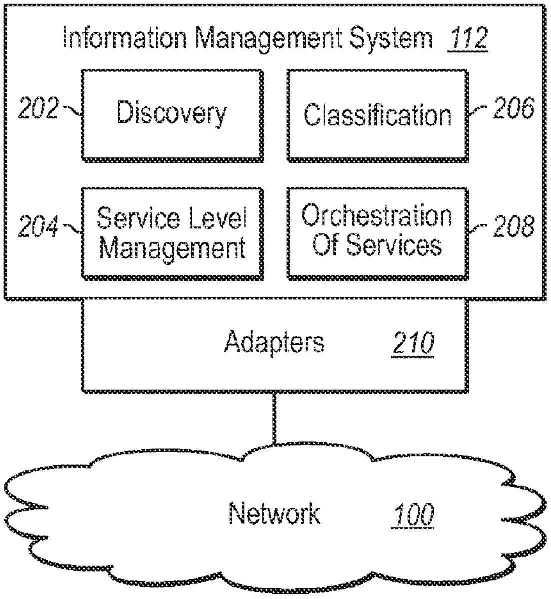
FIG. 2 illustrates one embodiment of a system and/or method for providing information management.

FIG. 2 is a flow diagram illustrating an example system and method for information management of data including unstructured data files or objects. FIG. 2 provides a preliminary overview of information management, with the delegation of information classification discussed in greater detail below with respect to FIGS. 3 and 4.

Discovery 202 is often the first aspect of information management. Generally, in one method of information management, discovery 202 includes both a discovery of the infrastructure or of environment objects (servers, devices, applications, etc.) and of the other objects (data, files, etc.) in the computer system. Thus, discovery 202 may be used to discover all the data objects to be classified by the present invention.

The discovery of the environment, for example, can include a discovery of all IP devices on the computer system 100 that appear to act as a server. In discovering these servers, discovery 202 includes discovering services and applications as well. Thus, discovery 202 includes discovering the servers, services, applications and data residing in a system.

The discovery of a computer system can be done in a variety of ways. The discovery of the environment objects, for example, may involve an examination or analysis of all IP addresses existing in a network. Devices that act as a server can thus be identified. Once these servers are identified, additional information can then be sought from those servers.

Applications can also be discovered. For example, many entities often have a payroll application that includes software working in conjunction with a database. The database can be examined and may have certain table or logs when acting, for example, as source for payroll application. The traffic on a network can also be decoded to examine headers to extract information that can characterize the network for the information management server. In this manner, the applications can be discovered. The discovery of an application can be used as additional input when categorizing the objects or data used by the payroll (or any other) application. For example, certain data or objects used by a payroll application may require special service levels that are not needed by other objects.

The discovery of all objects in a computer system is accomplished, in one embodiment, through the use of adapters 210. Each adapter enables the information management system to identify objects in or operating in the computer system 100. Alternately or additionally, the adapters enable the information management system to discover information about the objects. For example, some adapters can identify objects acting as a server or data objects such as files. Other adapters are specific to a particular type of server and may be able to collect firmware version, operating system, and other configuration data that is specific to that type of server. Other adapters can collect generated metadata or can examine the content to collect the existing metadata.

B. Classification in Information Management

Classification 206 is typically the next step in information management. However, the discovery of an environment does not need to be repeatedly performed. Once an environment is discovered, information management can then focus on the data that is in the computer system. Classification 206 is the process of collecting information about the objects (data and/or the environment) of a computer system and then identifying or associating the objects with categories. One result of classification is to associate objects being classified with certain categories. More particularly, information collected for objects identified during discovery 202 can be used to assign categories to the objects. The resulting categories can be used in subsequent parts of information management as described below.

Classification 206 can incorporate information collected during discovery, such as existing object metadata. Existing metadata can also be collected during classification 206. Alternately or additionally, classification 206 can include applying sets of rules or other logic to the objects in a computer system and using these rules to generate metadata. The rules can be default rules or rules that are selected according to a line of business of the entity or for any other reason. For example, objects that include social security numbers may have to be retained for some period of time per governmental regulations. Alternatively, objects whose owner is a member of marketing may only be retained for a few years but require full indexing.

In addition to applying rules to the objects of the entity, classification 206 also includes the generation of metadata, and applying the categorization rules to existing and newly generated metadata to assign a category. Generated metadata includes values that are derived from information objects rather than having been collected by the environment. For example, hash values can be generated and then used to identify duplicate objects. Another example of generated metadata is the case where the objects are examined for specified content such as keywords and/or patterns. This generated metadata, or metadata derived from an object being analyzed, are useful during the classification process. Existing metadata, on the other hand, can be collected from the objects or from the environment. For example, the owner, size, share, etc., of a file can be collected and used to automatically categorize an object. The collected metadata (both generated metadata and/or existing metadata) can then be used to assign categories relating to the content of the object or the object itself. In some embodiments, a particular object may be associated with more than one category.

In another embodiment, aging considerations or object lifecycle can be a consideration when classifying an object. On the other hand, aging considerations can be a component of service level mapping as discussed below. The aging characteristics or other lifecycle information of a particular object may also be used during the classification process. For example, an annual report is always an annual report. However, newer annual reports may require different services than older annual reports. This aging or lifecycle consideration can be part of classification and/or it can be considered during service level mapping.

One aspect of the present embodiment is the system's ability to recognize independent groupings (domains) of information owners, each of which can configure separate logic for classification and service mapping, even when service options (list of available service levels) are common to all groupings. Thus, whereas conventional information classification systems provide for an object to belong to only one area of service protection, the present invention is more closely tailored to current business models where various groups, or lines of business, may each have different considerations in determining the importance and relevance of information and the service levels each object requires. For instance, an engineering department may have only a cursory interest in the ability to retrieve files associated with each revision of an antiquated product-line, while the legal department may desire the same files to be easily accessible for litigation purposes. Under the embodiment of the present invention, each business line or domain may be associated with a different service level to be considered in determining the importance and relevance of each object within the management scheme.

Methods and systems for classifying objects in a computer system are disclosed in greater detail in U.S. patent application Ser. No. 11/528,772, filed Sep. 27, 2006 and entitled "Information Classification," which application is incorporated herein by reference in its entirety.

C. Service Level Mapping in Information Management

After the objects have been categorized during classification 206, service levels or service level objectives can then be identified for the various objects during service level management 204. Examples of service level objectives include backup, retention, tiered storage, encryption, access control, disaster recovery, and the like or any combination thereof for the objects or for the environment of the computer system. A category can be mapped through configuration data in one example to one or more service level objectives. A category can also be mapped to a lifecycle, each of whose stages may have different service level objectives. There may be several categories involved in the analysis of a single information object, resulting in a variety of service level objectives or possibly conflicting service level objectives. Information management can also resolve conflict, for example, using user supplied logic.

In other words, the classification process has already assigned categories to each of the objects. During the classification process, some of the various categories are assigned to each object as applicable. These categories can then be used to identify the service level objectives that may apply to the various objects. The classification, for example, may have identified a particular object as an annual report. The information management system may be configured to map annual reports to lifecycle L1. If the object in question has aged enough to be in the second stage of that lifecycle, then a service level objective for that stage may dictate that the file needs to be retained for a specific period of time. Alternatively, the classification of the object may also indicate that the object should be retained for some specified period of time, which may be different.

In this manner, the object that has been classified is then processed to identify the various service level objectives that should apply to the object. The service level objectives can then be bundled together into a target bundle that represents the service level objectives that are desired for the object. Next, service level mapping includes matching the target bundle of services with service packages that are actually available from service providers. If the service level objectives of the current bundle do not match or are not satisfied by the best matching actual service package, then a service gap is present. While embodiments of the invention may be used to select a particular service package, the invention could actually be used to provide services on a per object basis. Service providers, for reasons of practicality, often group services as a package and thus a service package is often selected, but embodiments of the invention extend beyond this particular aspect.

The use of service packages is often used by some entities that manage some or all of their services by restricting the offerings to a number of supported combinations of service levels. In other words, the particular combination of service level objectives may not correspond to a supported service package (also referred to herein as a service bundle). Embodiments of the invention contemplate logic that is used to find a suitable service package that is close enough to what the object needs. The information management system may be able to report that no existing service bundle or service package was sufficient.

D. Service Orchestration in Information Management

In information management, orchestration of services 208 is the process by which the services are orchestrated. Orchestration can automate multiple service actions and translate an end user service level request to provider action. The workflow needed to execute the services is coordinated during orchestration. Often, action orchestration requires the adapters to communicate with various service providers or with the various services to identify the service that can perform the requested action.

III. Delegation of Information Management Functions

Information classification as described herein requires a significant amount of processing power from an information management system. Consequently, the network or computer system size that can be efficiently managed by the information management system is necessarily limited by the processing capabilities of the information management system. However, embodiments of the invention contemplate the delegation of the intelligence required to perform information classification to a computing resource external to the information management system, such as a server. This offloads work from the information management system, enabling the information management system to manage relatively larger networks or computer systems.

Figure 3:
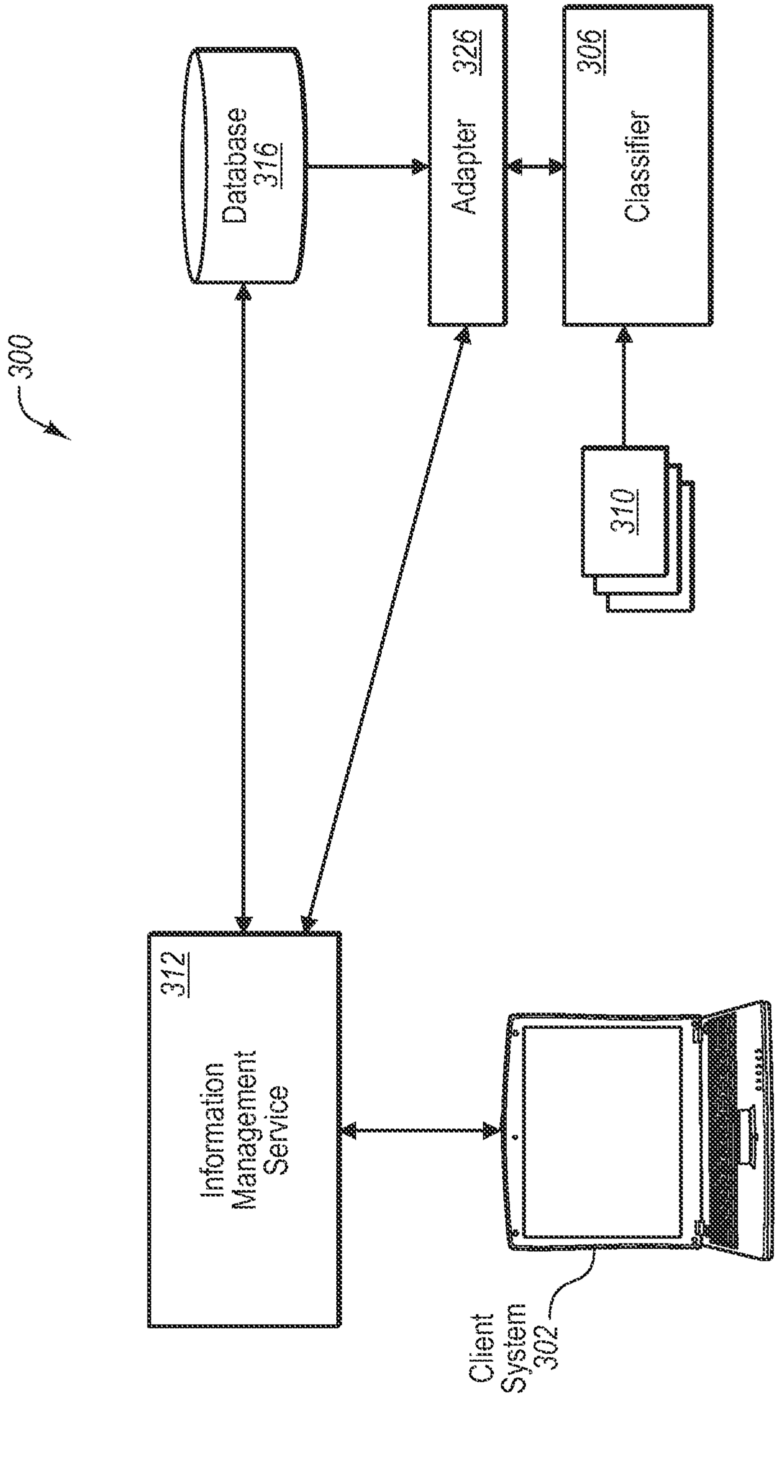
FIG. 3 illustrates one embodiment of a system for delegating information classification to a classifier.

Accordingly, FIG. 3 illustrates an example system 300 for delegating information classification to an external computing resource. The system 300 includes an information management system 312 for managing data, a client system 302 for configuring the information management system 312, a database 316 for storing configuration data, and a classifier for performing information management. In the present example, the information management system 312 and the client system 302 may correspond to the information management system 112 and clients 102, respectively, of FIG. 1. The classifier may be a server to which the information classification process is delegated.

The information management system 312 delegates the intelligence required to perform information classification to the classifier 306. In this manner, the classifier 306 can provide high-level data to the information management system 312 that the information management system 312 can use in performing information management. For instance, in the present example the information management system 312 provides the logic and rules necessary for information classification to the classifier 206. Not only can the classifier 306 perform low-level functions, such as identifying objects that satisfy particular logic and/or rules (e.g., file X contains the word Y), the classifier can also perform high-level functions, such as categorizing the objects (e.g., file X belongs to category Z because it contains word Y) and provide a list of or otherwise identify categorized objects to the information management system 312. Receiving high level data rather than low level data significantly reduces the processing power required by the information management system 312.

The information management system 312 is provided in a computer system and configured through a user interface such as a client computer 302. A system administrator or other user can use the client computer 302 to specify configuration data for the information management system 312, including logic and rules to apply during the classification process, such as attributes and content to look for and applicable information management categories for objects based on their attributes, content, etc. For example, configuration data may specify that if certain content (e.g., the term "medical") is found in an object with certain attributes (e.g., having extension ".doc"), the object belongs to a certain category (e.g., HIPAA files). One skilled in the art will appreciate that this example of configuration data to apply during the classification process is illustrative only and should not be construed to limit the invention.

More generally, the configuration data can be defined to utilize any and all abilities of the classifier 306. For example, many classifiers (e.g., classification engines) can look for words, phrases, patterns, entities, connections (e.g., proximity), and the like or any combination thereof. The term "medical" is one example of a word that can be looked for. However, a classifier could also look for the term "SSN" or the name of a company that is going to be acquired by an entity operating the information management system 312 or with whom the entity does business, or any other term that is meaningful to the entity in terms of classification. Phrases that might be searched for include titles of patents currently being applied for by the entity, or the phrase "social security number", or any other phrase that has meaning to the entity. Patterns can detect things like employee numbers, email addresses, social security numbers, or any other meaningful pattern. Further, since not every string (e.g., a 16-digit number) that matches a pattern (e.g., credit card account number pattern) is meaningful, pattern analysis can weed out false positives. Some classifiers can also identify entities. For example, finding a number that fits the pattern of a credit card number near some words that match the name of the owner of that credit card account can be more significant than finding just one of those. In effect, the classifier has discovered an entity, namely, the card holder. Accordingly, configuration data can be defined that classifies objects according to any one or more of numerous parameters that a classifier is configured to analyze and/or identify.

While the configuration data can be user-specified, default configuration data can also be used. In another embodiment of the invention, the information management system 312 can include a plurality of user-selectable configurations. Each of the user-selectable configurations can be directed to a particular industry, such as healthcare, legal, energy, high tech, etc. Typically, the configuration data—whether user-specified or default—is stored in the database 316.

In the present embodiment, the configuration data necessary for performing information classification (e.g., the logic and rules) is provided to the classifier 306. In some embodiments, the information management system 312 may express the logic and rules for information classification in a first format, while the logic and rules would have to be expressed in a second format for the classifier 306 to understand them. For this reason, the information management system 312 may communicate with the classifier 306 using an adapter 326. In effect, the adapter 326 translates communications between the classifier 306 and the information management system 312. Stated another way, the adapter provides a common language for the information management system 312 and the classifier 306. Thus, the classifier 306 and system 312 can communicate directly if they implement the same language (i.e., if they express logic and rules the same way), or the classifier 306 and system 312 can communicate through the adapter 326 if they implement different languages. Optionally, the database 316 can include a library of adapters such that the information management system can delegate the classification process to any one of many different classifiers. Alternatively or additionally, the adapters may be downloadable from a network.

In operation, the information management service 312 obtains a list of objects 310 in need of classification and identifies the objects 310 to the classifier 306. The list of objects 310 may be generated during discovery 202, as illustrated in FIG. 2. The classifier uses the configuration data to classify the objects 310, assigning each object to one or more categories. For instance, the classifier 306 may apply the logic and rules specified in the configuration data to identify and assign one or more categories to the objects 310. The classifier 306 then reports classifying information back to the information management system. Generally speaking, the classifying information identifies the objects 310 and one or more corresponding assigned categories.

Upon receiving the classifying information, the information management system 312 can use the classifying information to perform service level management and/or orchestration operations. That is, the information management system may identify one or more service level objectives for each object based on the assigned categories, map the one or more service level objectives to service levels available from service providers, and/or orchestrate the services for the objects. In one embodiment of the invention, the information management system 312 may also monitor the classifier 306 to ensure that information classification is being performed.

Figure 4:
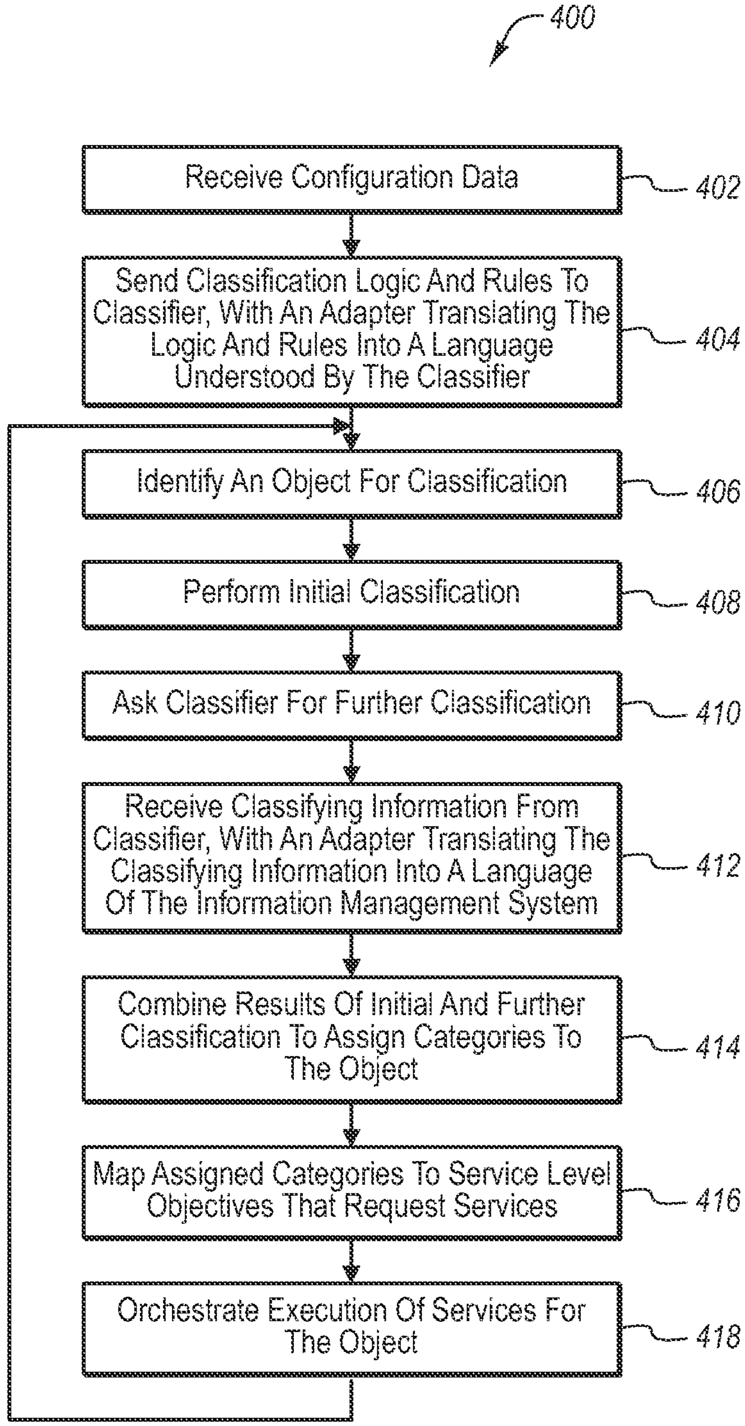
FIG. 4 illustrates an embodiment of a method for delegating information classification to an external computing resource, such as a classifier.

With reference now to FIGS. 3 and 4, a method 400 is described for delegating information classification to an external computing resource such as a classifier. The method 400 begins by receiving 402 configuration data at an information management system 312 in a computer system. The configuration data 402 may be stored in a database 316. Receiving the configuration data 402 may include receiving user input (i.e., through a client computer 302) configuring the information management system 312 and specifying logic and rules to apply for information classification.

After receiving the configuration data, the information management system 312 provides 404 the logic and rules for performing information classification to a classifier 306. Providing the classification logic and rules to the classifier can include providing an adapter for translating the logic and rules from a first format understandable by the information management system 312 to a second format understandable by the classifier 306.

In one embodiment of the invention, the method 400 proceeds by identifying 406 a data object 310 for classification. For instance, the information management system 312 can get a file description of an object 310 from its information discovery module (e.g., module 202 of FIG. 2). The information management system performs 408 an initial classification or internal analysis of the metadata and/or content of the object 310 to generate initial classification information and then asks 410 the classifier 306 for further classification of the object.

After having received the classification logic and rules and a classification request identifying an object from the information management system 312, the classifier 306 can use the logic and rules to perform information classification on the object 310, including collecting information describing the object, applying the logic and rules to the object, and/or assigning one or more categories to the object 310. In this manner, the classifier 306 can generate further classification information, which is reported back to the information management system 312.

The method 400 continues by receiving 412 classifying information from the classifier 306 after the classifier performs information classification. The classifying information identifies one or more categories assigned to each object and is provided to the adapter 326 for translation into the first format understandable by the system 312 prior to being received 412 by the information management system 312. Optionally, the received classifying information can be stored by the information management system 312 in the database 316.

The information management system 312 combines 414 or aggregates the results of the initial classification performed by the system 312 with the results of the further classification performed by the classifier 306.

The information management system 312 can then use the aggregate classifying information to drive treatment of classified data objects. Using the classifying information to drive treatment includes using the classification information to perform 416 service level management and/or to perform 418 orchestration of services for the data object. Alternately or additionally, driving treatment can include providing the classifying information to a second external computing resource (e.g., other than the classifier) for the second external computing resource to perform service level management or orchestration of services.

Once services have been orchestrated 418 for a data object, the process 400 returns to step 406 where the information management system 312 identifies 406 another object for classification, performs 408 initial classification, and so on. Thus, the process 400 can continually loop through steps 406 through 418 until all objects identified by a discovery module of the information management system have been classified and mapping and orchestration of services have been performed for the objects.

It should be apparent to one of skill in the art that the method 400 can be adapted for different configurations. For instance, as shown and described above, the classification process can be divided between an internal classifier of the information management system 312 and an external classifier 306. However, the method 400 can additionally be applied where the information management system delegates 100% of the classification process to the classifier 306. In this case, the information management system 312 would not need to perform initial classification (step 408), or combine classification information from an initial classification and a further classification (step 414). Alternately or additionally, the information management system 312 can delegate 404 classification to a plurality of external classifiers, in which case the method 400 may include asking 410 multiple classifiers to perform classification and aggregating 414 classifying information from the multiple classifiers, in addition to the other steps shown.

Information management enhances the ability of a system to manage its unstructured data across domains or enhances the ability of users to manage their data including unstructured data, across varying lines of business, and by identifying services that best meet the system's or entity's requirements. Furthermore, delegating information classification to an external computing resource permits an information management system to efficiently manage more information than would be possible without the delegation.

By delegating information classification to one or more external computing resources, the total amount of data that can be managed by the information management system 312 increases while the amount of processing power required to manage a given amount of data decreases.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical computer-readable media, including, RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A physical storage device having stored therein computer-executable instructions which, when executed by one or more processing devices, perform information management to identify services for objects in a computer system, wherein performing information management includes:

discovering a plurality of objects in the computer system, wherein discovery of the plurality of objects is performed using a first adapter;

transmitting configuration information to a classifier, wherein the transmitted configuration information includes classification logic and rules;

delegating, to the classifier, a secondary object classification process that is associated with the classification logic and rules and also associated with a second adapter that is different from the first adapter, the second adapter being operable to translate the classification logic and rules from a first format to a second format that is different from the first format;

performing an initial classification of the plurality of objects so as to generate initial classification information concerning the plurality of objects, and assigning a category to each of the classified objects;

determining a service for each of the plurality of objects individually based on the assigned category of each object;

requesting performance, by the classifier, of a secondary classification of the initially classified plurality of objects, wherein the secondary classification is based on the classification logic and rules associated with the delegation of the secondary classification process;

receiving, from the classifier, secondary classification information that identifies one or more of the plurality of objects and one or more categories assigned to the objects individually, wherein one of the categories is mapped to a service level objective;

aggregating the received secondary classification information with the initial classification information to produce aggregated classification information; and utilizing the aggregated classification information to drive treatment of one or more of the plurality of objects, wherein the treatment includes providing one or more services to the objects, the one or more services corresponding to the one or more categories assigned to the objects, wherein one of the services is associated with the service level objective; and responding, when a service gap exists, to the service gap by one of finding and providing a service bundle that is adequate for associated objects, or reporting that no existing service bundle is adequate for the associated objects, wherein the service gap exists if a target bundle that includes the service level objective does not match any available service bundle.

2. The physical storage device of claim 1, wherein utilizing the aggregated classification information to drive treatment of one or more of the plurality of objects comprises one or more of:

identifying one or more service level objectives for each object based on the assigned one or more categories;

mapping the one or more service level objectives to service levels available from service providers; or orchestrating the services for one or more of the plurality of objects based on the assigned one or more categories, the identified one or more service level objectives, or both.

3. The physical storage device of claim 1, wherein performing information management further comprises monitoring to ensure that the secondary classification is being performed.

4. The physical storage device of claim 1, wherein performing information management further comprises valuing the objects based on the assigned categories of the objects.

5. The physical storage device of claim 1, wherein the logic and rules are specified by a user.

6. The physical storage device of claim 1, wherein discovering a plurality of objects comprises one or more of:

examining internet protocol (IP) addresses in the computer system;

discovering one or more applications in the computer system;

decoding network traffic;

discovering services associated with the computer system;

identifying an object that is acting as a server;

discovering information about a server;

discovering one or more data objects; or discovering information about one or more of the objects in the computer system.

7. The physical storage device of claim 1, wherein the first adapter is specific to the type of objects that the first adapter is used to discover.

8. The physical storage device of claim 1, wherein performing information management further comprises mapping different categories to respective lifecycle stages of a discovered object.

9. A physical server that includes the physical storage device of claim 1.

10. A physical storage device having stored therein computer-executable instructions which, when executed by one or more processing devices, perform information management in a computer system including data that has been partitioned according to one or more criterion, wherein performing information management includes:

receiving configuration information that includes translated classification logic and rules relating to information management categories for objects discovered in a computer system and which have been initially classified;

collecting information describing the initially classified objects;

receiving, by delegation, a request to perform a secondary classification service concerning the initially classified objects;

performing the delegated secondary classification service by applying the translated classification logic and rules to the initially classified objects and to the collected information that describes the initially classified objects, so as to generate secondary classification information concerning those initially classified objects, wherein the translated classification logic and rules are driven at least by the collected information;

assigning one or more categories of information management to each initially classified object;

reporting high level information comprising the one or more categories assigned to each object so as to enable mapping of categories to a service level objective for each of the initially classified objects, and to enable identification of services for each of the objects based on the one or more categories assigned to each object, wherein one of the services is associated with the service level objective for an object and the service level objective is part of a target bundle of service level objectives, and wherein a service gap exists when the target bundle does not match any available service bundle, and a response to the service gap is one of finding and providing a service bundle that is adequate for the associated objects, or reporting that no existing service bundle is adequate for the associated objects; and reporting the secondary classification information to an information management system that is operable to aggregate the secondary classification information with the primary classification information to produce aggregated classification information.

11. The physical storage device of claim 10, wherein performing information management further comprises, prior to reporting the secondary classification information, translating the secondary classification from a first format to a second format that is different from the first format.

12. The physical storage device of claim 11, wherein the translation is performed using an adapter.

13. The physical storage device of claim 10, wherein delegation of the secondary classification service transfers a portion of a processing load.

14. The physical storage device of claim 10, wherein the secondary classification information includes information identifying the objects and corresponding assigned categories of information management.

15. The physical storage device of claim 10, wherein the logic and rules used to classify the objects use metadata associated with each object describing capabilities, features, a hash, and content, of each object.

16. The physical storage device of claim 10, wherein the objects include at least one of directories, volumes, files, folders, user data, system data, applications, services, operating systems, instructions, and computer settings.

17. The physical storage device of claim 10, wherein collecting information includes generating metadata for each object, and the method further comprises using the generated metadata to assign the object to one or more categories.

18. A physical server that includes the physical storage device of claim 10.

19. An information management system, comprising:

a first adapter;

a second adapter, the second adapter being different from the first adapter;

a classifier; and a server configured for communication with a computer system, the first adapter, and the second adapter, and the server comprising:

a physical storage device having stored therein computer-executable instructions which, when executed by one or more processing devices, perform information management, wherein performing information management includes:

discovering, using the server, a plurality of objects in the computer system, wherein discovery of the plurality of objects is performed using the first adapter;

transmitting, to the classifier, configuration information that includes classification logic and rules;

delegating, using the server, a secondary object classification process to the classifier, the secondary object classification processing being associated with the classification logic and rules and also with the second adapter, the second adapter being operable to translate the classification logic and rules from a first format to a second format that is different from the first format;

performing, using the server, an initial classification of the plurality of objects so as to generate initial classification information concerning the plurality of objects, and assigning a category to each of the classified objects;

determining, using the server, a service for each of the plurality of objects individually based on the assigned category of each object;

requesting, using the server, performance by the classifier of a secondary classification of the initially classified plurality of objects, wherein the secondary classification is based on the classification logic and rules associated with the delegation of the secondary classification process;

receiving, using the server, secondary classification information from the classifier that identifies one or more of the plurality of objects and one or more categories assigned to the objects individually, wherein one of the categories is mapped to a service level objective;

aggregating, using the server, the received secondary classification information with the initial classification information to produce aggregated classification information;

utilizing, using the server, the aggregated classification information to drive treatment of one or more of the plurality of objects, wherein the treatment includes providing one or more services to the objects, the one or more services corresponding to the one or more categories assigned to the objects, wherein one of the services is associated with the service level objective; and responding, by the server, when a service gap exists, to the service gap by one of finding and providing a service bundle that is adequate for associated objects, or reporting that no existing service bundle is adequate for the associated objects, wherein the service gap exists if a target bundle that includes the service level objective does not match any available service bundle.

20. The information management system as recited in claim 19, wherein the server is configurable by way of a client computer.

* * * * *